Nov. 29, 1966 J. E. OLIVER 3,288,518
CAMPER VEHICLE BODY
Filed Sept. 24, 1964 3 Sheets-Sheet 1
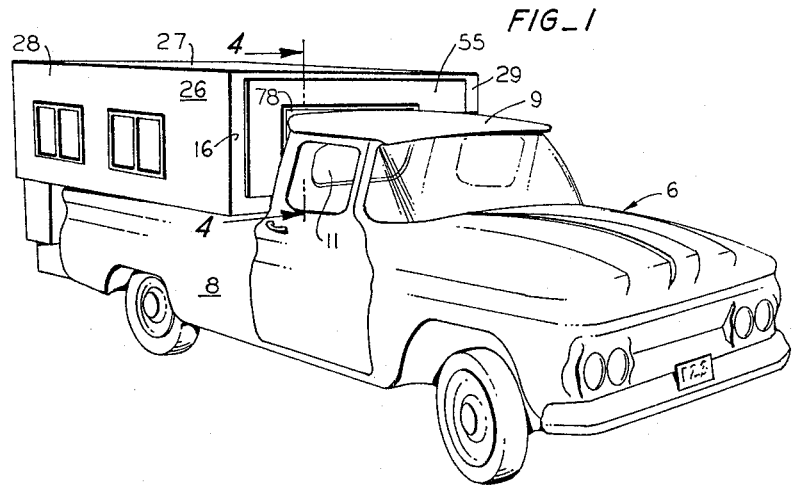
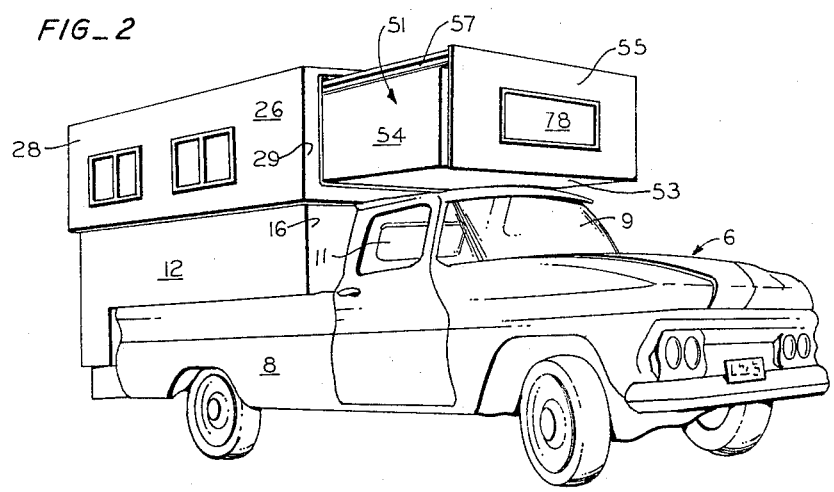
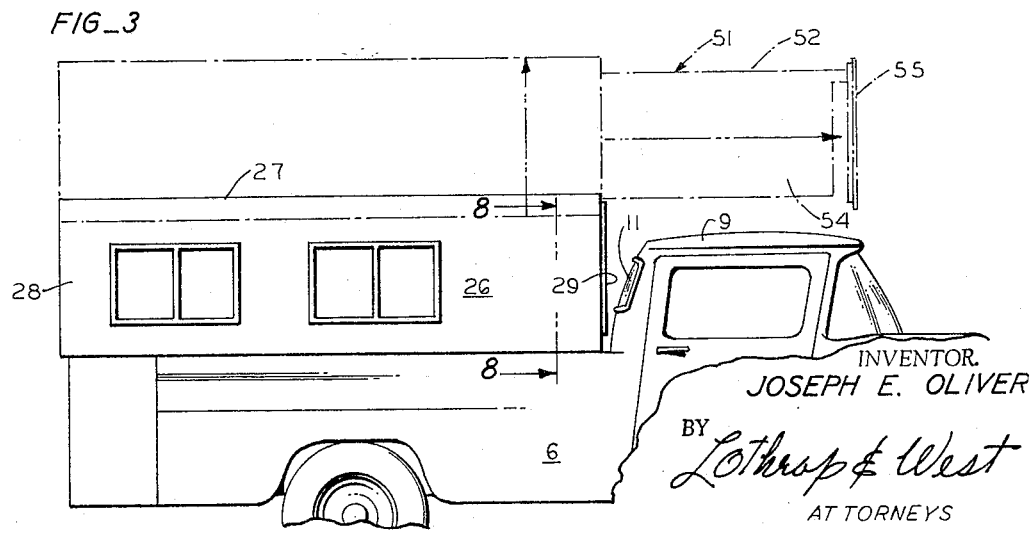
INVENTOR.
JOSEPH E. OLIVER
BY Lothrop & West
ATTORNEYS

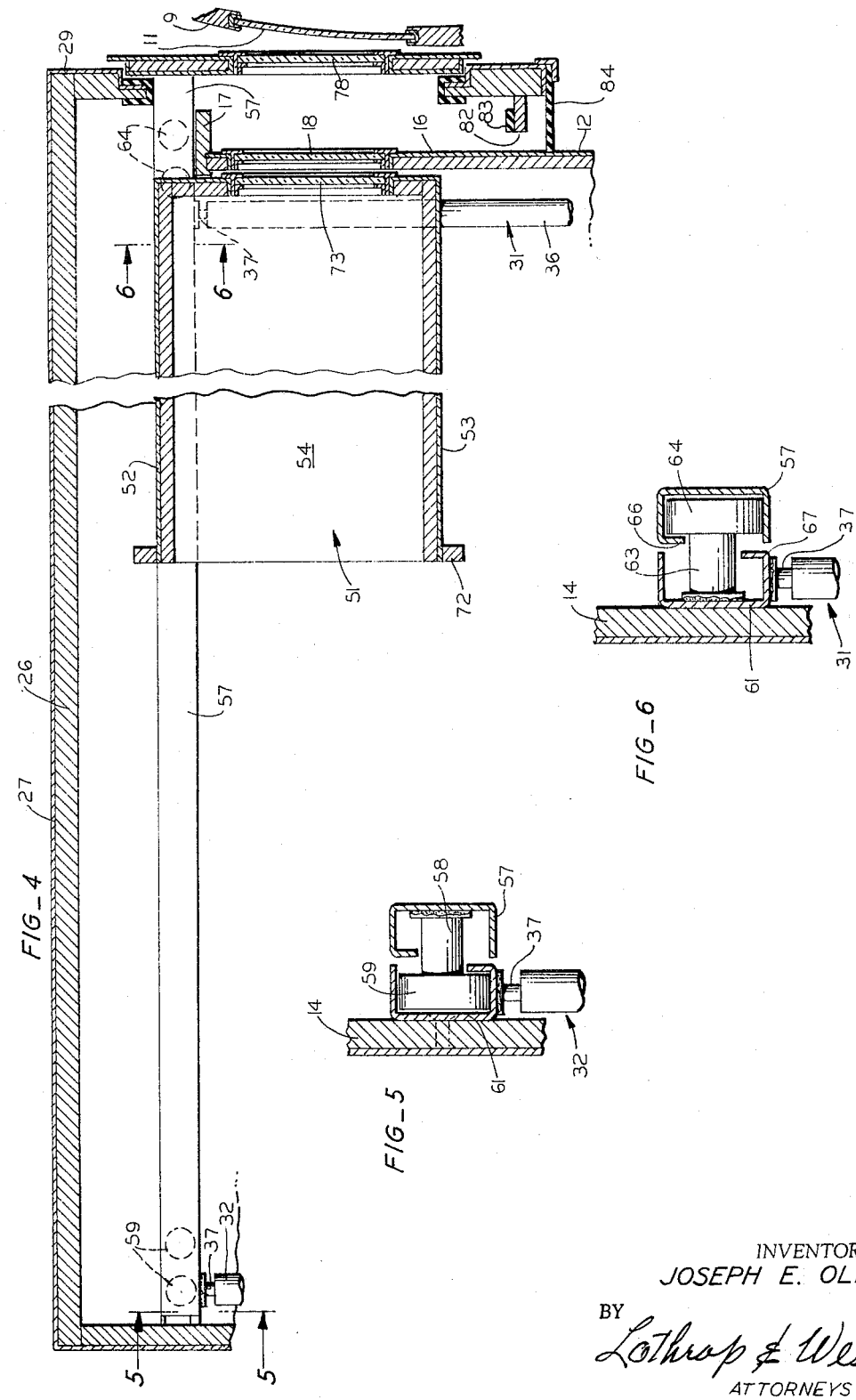

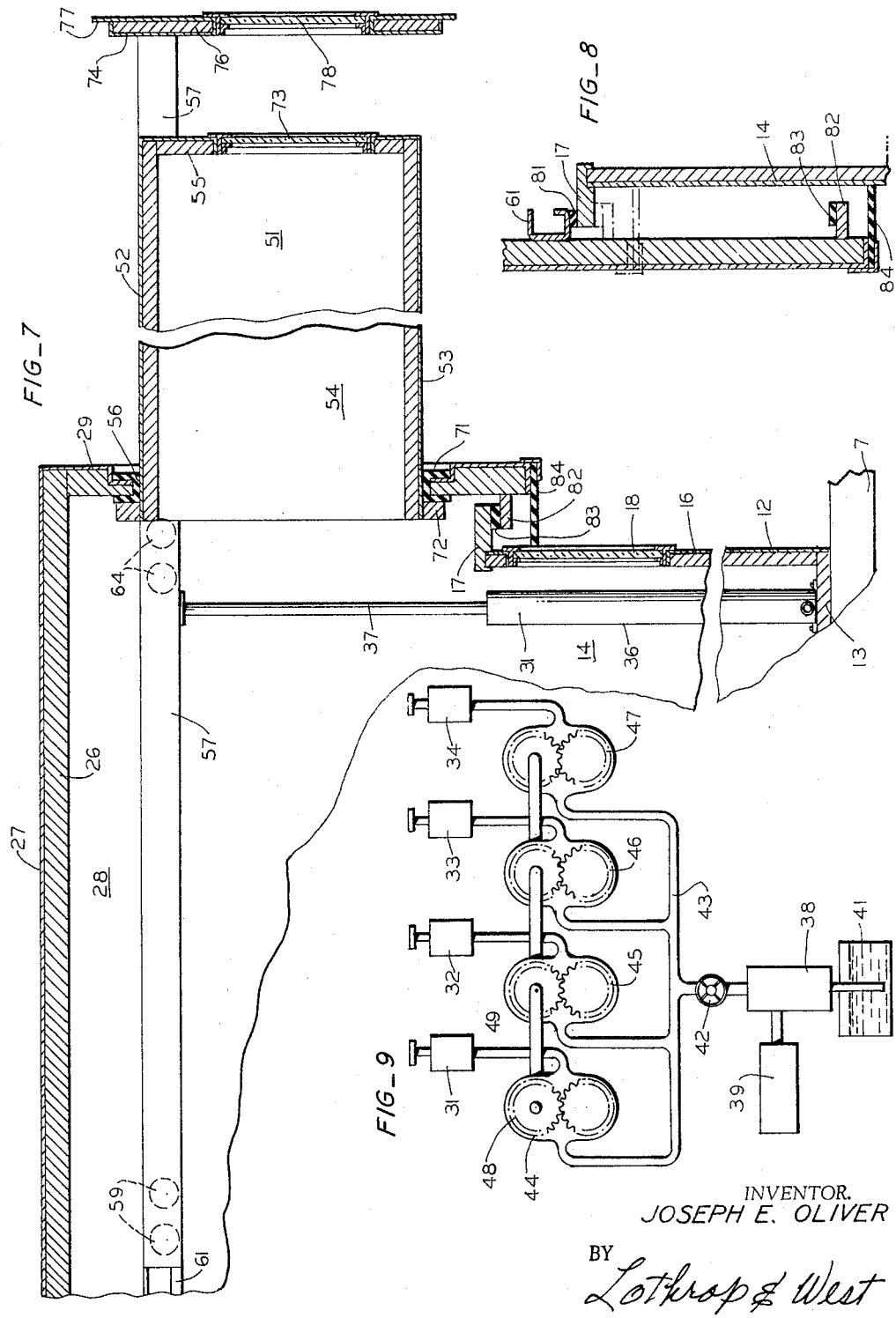

3,288,518
CAMPER VEHICLE BODY
Joseph E. Oliver, Le Grand, Calif., assignor of ten percent to Lester J. Gendron, Madera, Calif., ten percent to Pete Curutchet or Mildred Curutchet, seven and one-half percent to Dan C. Fore or Deanna Fore, six and one-half percent to W. H. Baker or Lorene Baker, and four and one-half percent to L. H. Bowen or Milly B. Bowen, all of Chowchilla, Calif.
Filed Sept. 24, 1964, Ser. No. 398,852
6 Claims. (Cl. 296—23)

My invention relates to a body adapted to be mounted on a vehicle such as a pickup truck and is for the purpose of providing a so-called "camper" or living enclosure within the vehicle body. It is desirable to have a camper vehicle body of full height for ease of use by the occupants, but the dimensions of a full height camper are such that it is unwieldly for highway travel in many localities. Consequently, forms of camper body have been made in which the body has an upper section which telescopes vertically with respect to a fixed lower section. The instant body is of that type.

It is an object of my invention to provide a camper vehicle body in which an upper enclosure telescopes over a lower enclosure and is provided with extra room which can be utilized when the body is extended.

Another object of the invention is to provide a camper vehicle body in which even though there is a body extension, the body is well closed and sealed when in its extreme positions so that the elements are kept out.

Another object of the invention is to provide a camper vehicle body having considerably more than the usual capacity.

Another object of the invention is to provide a camper vehicle body in which the body when stowed or collapsed does not constitute any substantial interference with the normal operation of the vehicle on which it is mounted.

A still further object of the invention is to provide a camper vehicle body of an improved nature.

Other objects together with the foregoing are attained in the embodiment of the invention described in the accompanying description and illustrated in the accompanying drawings, in which:

FIGURE 1 is a perspective view of a camper vehicle body with the body in its collapsed or compact position;

FIGURE 2 is an isometric view of the camper vehicle body showing the body in its extended position for use;

FIGURE 3 is a side elevation of the camper vehicle body in its compact position;

FIGURE 4 is a cross section, the general plane of which is indicated by the line 4—4 of FIGURE 1, showing interior construction of the vehicle body with portions broken away;

FIGURE 5 is a detail cross section, the plane of which is indicated by the line 5—5 of FIGURE 4;

FIGURE 6 is a detail cross section, the plane of which is indicated by the line 6—6 of FIGURE 4;

FIGURE 7 is a cross section somewhat similar to FIGURE 4 but showing the parts in extended position;

FIGURE 8 is a cross section, the plane of which is indicated by the line 8—8 of FIGURE 3; and FIGURE 9 is a diagram showing the arrangement of the hydraulic elevating mechanism.

The camper vehicle body can be incorporated in a number of different ways for practical use. In one representative example, the device is incorporated as shown herein for installation on a vehicle 6 of the pickup type. This vehicle includes a frame 7 (FIGURE 7) and side panels 8. The camper body is installed to the rear of the cab 9 of the vehicle, the cab having a rear window 11 (FIGURE 4) therein.

The vehicle body includes a lower enclosure 12 including a floor 13 and side walls 14 and a front wall 16, all firmly fastened to the vehicle frame 7 and disposed between the vehicle side walls 8. The upper end of the side walls 14 and of the front wall 12 is finished by a horizontal plate 17, the elevations of which is approximately even with the top of the vehicle cab 9. In order that there may be no obstruction to the rear window 11 of the cab, the lower enclosure 12 has a suitable transparent window 18 in its front wall 16. The rearward portion of the lower enclosure is provided with an appropriate glazed door, not shown. The rearmost portion of the camper is not illustrated in detail since this follows the construction of the remainder of the device.

Adapted in one position to rest upon the plate 17 is an upper enclosure 26. This is of somewhat larger dimensions than the lower enclosure and includes a roof 27, lateral walls 28 and a forward wall 29. In one position of the parts, the top of the upper enclosure is spaced well above the lower enclosure, and in another position of the parts, the upper enclosure telescopes with and is compacted with the lower enclosure. For this reason, the corners of the enclosures are provided with rollers (not shown) to serve as guides in order that the relative travel of the parts will be in the desired rectilinear path without binding.

In order to operate the upper enclosure on the lower enclosure, each of the corners of the device is provided with one of a plurality of hydraulic mechanisms 31, 32, 33, and 34. Each of these devices is like the others and includes a lower cylinder 36 and an extending piston rod 37. The cylinder 36 is appropriately mounted in the corners of the floor 13 and the piston 37 is fastened to a convenient point of the upper enclosure.

So that all of the hydraulic mechanisms 31, 32, 33 and 34 will operate in exactly the same way and in order to preclude binding of the enclosures, I preferably provide, as illustrated in FIGURE 9, a hydraulic system including a hydraulic pump 38 driven by an electric motor 39 and withdrawing hydraulic fluid from a reservoir 41. The pump 38 discharges through a hand operated valve 42 into a manifold 43 leading to a number of positive displacement devices 44, 45, 46 and 47. Each one of these is comparable to a gear pump disposed within a closed housing and is characterized by the provision of a gear 48 fast on a common shaft 49 extending through all of the devices 44, 45, 46 and 47. Each of the devices leads through its individual outlet to a respective one of the cylinders 31, 32, 33 and 34.

When the valve 42 is open and the motor 39 is energized, the pump 38 withdraws liquid from the reservoir 41 and propels such liquid through the various devices 44, 45, 46 and 47. Since these are all positive displacement devices connected together by the common shaft 49, they all pass exactly the same amount of hydraulic fluid in a given time. Thus the piston rods 37 of the various cylinders 31, 32, 33 and 34 are all equally displaced in the same time. Thus the upper enclosure moves evenly with respect to the lower enclosure and there is no binding or tilting. When the upper enclosure is in its extended position, the valve 42 can be closed, thus trapping the hydraulic fluid so that the upper enclosure is held in place.

When the upper enclosure is to be lowered, it is merely necessary to open the valve 42. The force of gravity is sufficient to drive the piston rod 37 back into the various cylinders 31, 32, 33 and 34 and to return the hydraulic fluid to the reservoir 41, rotating the pump 38 and the motor 39 in the process. If desired, however, the valve can be turned to a position to by-pass the pump 38 or, as an alternative, the motor 39 can be electrically driven in a reverse direction in order to accelerate the return movement of the parts.

Particularly pursuant to the invention, there are means for affording more than the usual space enclosure in the body. This is accomplished by providing a particular compartment 51 including a top 52, a bottom 53, side walls 54 and a leading wall 55. The compartment generally is of rectangular configuration and is of a size to pass through an opening 56 provided in the forward wall 29. The compartment 51 is supported by being fastened to a pair of side rails 57 of channel shape extending along both of the sides 54 of the compartment and in fact extending ahead of the compartment and also extending well behind the compartment.

The side rails 57 adjacent their rear ends carry extended stub shafts 58 provided with rotary wheels 59 designed to operate in side rails 61 firmly fastened to the lateral walls 28 of the upper enclosure. Mounted within the forward portion of the side rails 61 are stub shafts 63 (FIGURE 6) at their outer ends carrying wheels 64 designed to operate wth the side rails 57. Both the side rails 57 and 61 are provided for practically their entire length with inturned flanges 66 and 67 to preclude lateral dislodgment of the respective wheels 59 and 64.

With this arrangement, the compartment 51 resting on the side rails 57 is supported on the wheels 59 and 64. Conveniently, as shown particularly in FIGURES 4 and 7, the wheels are duplicated in order to reduce the concentration of load. So supported, the compartment 51 can be moved through the opening 56 between a position inside the upper end closure and a position almost entirely outside the upper enclosure. Because of the sliding movement of the compartment 51, the opening 56 is provided with a sealing strip 71 around its periphery. To serve as a limit stop for the movement of the compartment 51 as well as a tight closure, the inner end of the compartment is enlarged to provide an abutting flange 72 designed to cooperate with the seal 71 when the compartment is withdrawn in order to preclude leakage therebetween.

In its innermost position, the compartment 51 is designed to occupy a location so that the leading wall 55 is disposed just behind the front wall 12 of the lower enclosure. Also, in order to provide for a view through the window 18, the forward end of the compartment 51 is provided with a window 73 designed to overlie the window 18 when the compartment is in its inner position and the upper enclosure is collapsed upon the lower enclosure.

Since the window opening 56 would otherwise not be well closed when the compartment 51 is fully withdrawn, I extend the side rails 57 sufficiently ahead of the leading wall 55 to serve as mountings for an advance wall 74. This wall is dependent from the two side rails 57 and includes a portion 76 designed to occupy a recessed part of the window 56 and also includes an exterior flange 77 designed to abut against the forward wall 29. Thus, when the compartment is retracted, the advance wall lies within the window opening and against the body so as to afford a good seal. Located in the advance wall in line with the window 73 is a window 78.

In the operation of this structure, when the body is entirely extended and is to be compacted, the user manually retracts the compartment 51 with the various side rails and rollers cooperating to permit relative sliding movement of the compartment into the raised upper enclosure. This withdrawing movement is continued until such time as the leading wall lies in a vertical plane behind the front wall 12 and until the advance wall 74 is firmly home within the window opening.

When that has been accomplished, the valve 42 in the hydraulic system is opened and the upper enclosure is permitted to descend by gravity but evenly because of the positive displacement devices 44, 45, 46 and 47 onto and to telescope with the lower enclosure. When the upper enclosure has attained its lowermost position, the side rails 57 are substantially above the top plate 17 of the lower enclosure and the windows 18, 73 and 78 are all in alignment with the cab rear window 11, as shown in FIGURE 4, so that there is available not only a view into the interior of the camper vehicle body, but also through the body out of a corresponding window, not shown, in the rear wall. The vehicle driver thus has a view immediately to the rear despite the presence of the camper vehicle body.

In its lowermost position, the weight of the upper enclosure is borne through the side rails 61 on the plate 17 as shown in FIGURE 8. Conveniently, a rubber pad 81 is provided not only as a cushion but also as a sealant so that when the body is compact, the likelihood of leakage is eliminated.

When the body is to be extended, the hydraulic pump 38 is again started, the valve 42 is opened and the upper enclosure is lifted. The lifting movement goes on until such time as a stop ledge 82 on the inside of the lateral walls 28 comes into abutment with the lower face of the plate 17. At that time, the motor 39 can be shut off and the valve 42 closed. The stop 82 also carries a rubber packing 83 to serve not only as a cushion, but as an extra seal against leakage when the vehicle body is extended upwardly.

As a further seal, it is preferred that the lower margin of the lateral walls 28 likewise be provided with a slightly flexible fin 84 cooperating with the outside of the lower enclosure side walls 14 so that despite the telescoping arrangement of the parts there is a good seal therebetween. Also the fin 84 acts as a scraper to remove any adherent obstructions to easy telescoping. While the description has been largely concerned with the side walls of the upper enclosure and the lower enclosure, the same sort of stop and sealing arrangement continues around the periphery of the vehicle.

What is claimed is:
1. A camper vehicle body comprising:
   a. a lower enclosure including a pair of parallel side walls and a front wall joining said side walls;
   b. an upper enclosure including a pair of parallel lateral walls and a forward wall having an opening therein;
   c. means for mounting said upper closure on said lower enclosure for movement between a lower position with said lateral walls and said forward wall overlying said side walls and said front wall and an upper position with said lateral walls and said forward wall higher than said side walls and said front walls;
   d. a compartment;
   e. means for suspending said compartment on said upper enclosure for movement through said opening between a position inside said upper enclosure and a position outside said upper enclosure; and,
   f. means on said compartment overlying and closing said opening when said compartment is inside said upper enclosure and said upper enclosure is in said lower position.

2. A camper vehicle body as in claim 1 and including hydraulic means for raising and lowering said upper enclosure relative to said lower enclosure, said hydraulic means including a plurality of cylinders and pistons, and a plurality of positive displacement devices connected by a common shaft, each of said devices being connected to a corresponding one of said cylinders for equal displacement of said pistons.

3. A camper vehicle body as in claim 1 wherein said compartment includes a leading wall and wherein said leading wall is located ahead of said front wall when said compartment is outside said upper enclosure and behind said front wall when said compartment is inside said upper enclosure.

4. The camper vehicle body of claim 3 further characterized by a first window in said front wall and a second window in said leading wall, said first window and said second window being in registry when said compartment is inside said upper enclosure and said upper enclosure is in said lower position.

5. A camper vehicle body as in claim 3 further characterized by an advance wall mounted on said compartment and spaced forwardly from said leading wall a sufficient distance such that said advance wall is located ahead of said front wall when said compartment is inside said upper enclosure and said upper enclosure is in said lower position.

6. The camper vehicle body of claim 5 further characterized by a third window in said advance wall, said third window being in registry with said first window and said second window when said compartment is inside said upper enclosure and said upper enclosure is in said lower position.

References Cited by the Examiner
UNITED STATES PATENTS

| | | |
|---|---|---|
| 2,813,747 | 11/1957 | Rice. |
| 2,879,103 | 3/1959 | Hall. |
| 3,145,046 | 8/1964 | Orn _____ 296—26 |

FOREIGN PATENTS

| | | |
|---|---|---|
| 424,791 | 2/1935 | Great Britain. |

BENJAMIN HERSH, *Primary Examiner.*

P. GOODMAN, *Assistant Examiner.*